(12) United States Patent
Kim et al.

(10) Patent No.: US 8,526,390 B2
(45) Date of Patent: Sep. 3, 2013

(54) METHODS AND SYSTEMS FOR DYNAMIC STICKY REGION ALLOCATION IN MAP-BASED COMMUNICATION SYSTEMS

(75) Inventors: Doo Seok Kim, Pleasanton, CA (US); Guangming Carl Shi, San Diego, CA (US); Chun Woo Lee, San Ramon, CA (US)

(73) Assignee: Qualcomm Incorporated, San Diego, CA (US)

(*) Notice: Subject to any disclaimer, the term of this patent is extended or adjusted under 35 U.S.C. 154(b) by 739 days.

(21) Appl. No.: 12/176,276

(22) Filed: Jul. 18, 2008

(65) Prior Publication Data

US 2009/0310543 A1   Dec. 17, 2009

Related U.S. Application Data

(63) Continuation-in-part of application No. 12/137,540, filed on Jun. 12, 2008.

(51) Int. Cl.
*H04W 4/00* (2009.01)

(52) U.S. Cl.
USPC ............. 370/330; 375/259; 375/260

(58) Field of Classification Search
USPC ............. 370/203–211; 375/259–260
See application file for complete search history.

(56) References Cited

U.S. PATENT DOCUMENTS

| | | | |
|---|---|---|---|
| 6,466,544 B1 | 10/2002 | Sen et al. | |
| 7,664,087 B2 | 2/2010 | Cho et al. | |
| 2005/0249142 A1* | 11/2005 | Kim et al. | 370/312 |
| 2007/0206561 A1* | 9/2007 | Son et al. | 370/346 |
| 2008/0031128 A1* | 2/2008 | Jang et al. | 370/210 |
| 2008/0062944 A1 | 3/2008 | Smith et al. | |
| 2008/0095037 A1 | 4/2008 | Chang et al. | |
| 2008/0102848 A1 | 5/2008 | Jung et al. | |

(Continued)

FOREIGN PATENT DOCUMENTS

| | | | |
|---|---|---|---|
| EP | 1213871 A1 * | 6/2002 | |
| EP | 1811730 A1 | 7/2007 | |
| WO | 2008056774 A1 | 5/2008 | |

OTHER PUBLICATIONS

"Broadband Radio Access Networks (BRAN); Hiperaccess Functional Specification Part 2—Data Link Control (DLC) layer; DTS/BRAN-0030002" ETSI Standards, LIS, Sophia AntipOlis Cedex, France, No. V0.c, Aug. 1, 2001, XP014036956 ISSN: 0000-000110. Initialization.

(Continued)

*Primary Examiner* — Charles C Jiang
(74) *Attorney, Agent, or Firm* — Charles Chesney

(57) ABSTRACT

Methods and apparatus for allocating, modifying, and terminating a fixed data region (termed "sticky region allocation") in an orthogonal frequency-division multiplexing (OFDM) or orthogonal frequency division multiple access (OFDMA) frame are provided. With sticky region allocation, the sticky region may be negotiated during the establishment of a connection between a base station and a user terminal, and a single MAP information element (MAP IE) may inform the user terminal of the location of the sticky region. Then, a user terminal can receive/send data bursts for a certain connection in multiple OFDM/OFDMA frames without needing a MAP IE for locating each burst in subsequent frames. Accordingly, the size of the control overhead, such as the downlink (DL) and uplink (UL) MAP messages, may be reduced. The reduced control overhead may increase the frame resources available for data traffic and thus, may boost the overall efficiency and performance of OFDM/OFDMA wireless systems.

66 Claims, 13 Drawing Sheets

(56) References Cited

U.S. PATENT DOCUMENTS

| | | | |
|---|---|---|---|
| 2008/0170490 A1* | 7/2008 | Connors et al. | 370/203 |
| 2008/0175215 A1* | 7/2008 | Oh et al. | 370/338 |
| 2008/0186886 A1* | 8/2008 | Cho et al. | 370/310 |
| 2009/0075667 A1* | 3/2009 | Bourlas | 455/452.1 |
| 2009/0310477 A1 | 12/2009 | Lee et al. | |
| 2010/0103886 A1* | 4/2010 | Chun et al. | 370/329 |
| 2010/0165908 A1* | 7/2010 | Mun et al. | 370/312 |

OTHER PUBLICATIONS

"IEEE Draft Standard for Local and metropolitan area networks—Part 16: Air Interface for Broadband Wireless Access Systems. 802.16Rev2/D5" IEEE Draft Standard for Local and Metropolitan Area Networks, Jun. 6, 2008, p. 1-910, XP002553171 pp. 790-797.

International Search Report—PCT/US2009/047126—International Search Authority, European Patent Office, Oct. 18, 2009.

Jianmin Lu et al., "Persistent allocation" IEEE C802.16MAINT-08/056R3, Jan. 18, 2008, pp. 1-9, XP002553170 pp. 2-5.

Lei Wang, Brian Gieschen, OFDM Frame Structure, IEEE 802.16 Broadband Wireless Access Working Group, <http://ieee802.org/16>, Jan. 11, 2002.

Written Opinion—PCT/US2009/047126—ISA/EPO—Oct. 18, 2009.

3GPP TR 25.814 V7.1.0, Technical Report, "3rd Generation Partnership Project, Technical Specification Group Radio Access Network, Physical layer aspects for evolved Universal Terrestrial Radio Access (UTRA) (Release 7)", 3GPP TR 25.814 V7.1.0, [Online] vol. 25.814, No. V7.1.0, Sep. 1, 2006, pp. 1-133.

Xu H., et al., "Persistent Scheduling—Change Indicator", IEEE C802.16maint-08/189r3, May 14, 2008, pp. 1-10.

Yanover V., et al., "Persistent Allocations—clarifications", IEEE C802.16maint-08/205, Apr. 19, 2008, pp. 1-4.

* cited by examiner

| FCH(DLFP)_Message_Format | |
|---|---|
| 412a Used SCH bitmap: A bitmap indicating which groups of SCH are used on the 1st PUSC zone and on PUSC zones in which 'use all SC' indicator is set to '0' in STC_DL_Zone_IE0. Value 1 means used by this segment and 0 means not used.<br>　　　　　　　　　　　2048　　　1024　　　512　　　128<br>　　bit 0: SCH Group 0　　0~11(12)　0~ 5(6)　0~4(5)　0(1)<br>　　bit 1: SCH Group 1　12~19( 8)　6~ 9(4)　NA　　　NA<br>　　bit 2: SCH Group 2　20~31(12)　10~15(6)　5~9(5)　1(1)<br>　　bit 3: SCH Group 3　32~39( 8)　16~19(4)　NA　　　NA<br>　　bit 4: SCH Group 4　40~51(12)　20~25(6)　10~14(5)　2(1)<br>　　bit 5: SCH Group 5　52~59( 8)　26~29(4)　NA　　　NA | 6 bits |
| 412b Reserved: set to 0 | 1 bit |
| 412c Repetition Coding Indication: on DL Map No additional Rep=total1(0), 1 additional Rep=total2(1), 3 additional Rep=total4(2), 5 additional Rep=total6(3) | 2 bits |
| 412d Coding Indication: on DL Map DL Map shall be transmitted with QPSK at FEC rate 1/2 The BS ensures that DL Map (and other MAC msg required for SS operation) are sent with the mandatory coding scheme often enough to ensure uninterrupted operation of SS supporting only the mandatory coding scheme.<br><br>CC(0), BTC(1), CTC(2), ZTCC(3), CC w oINT(4), LDPC(5) | 3 bits |
| 412e DL Map Length: Defines the length in slots of the DL Map msg that follows immediately the DLFP, after repetition code is applied. | 8 bits |
| 412f Reserved: set to 0 | 4 bits |

FIG. 4B

METHODS AND SYSTEMS FOR DYNAMIC STICKY REGION ALLOCATION IN MAP-BASED COMMUNICATION SYSTEMS

CLAIM OF PRIORITY

This application is a continuation in part of, and claims the benefit of priority from, U.S. patent application Ser. No. 12/137,540, filed Jun. 12, 2008 and entitled "Methods and Systems for Sticky Region Allocation in OFDMA Communication Systems," which is assigned to the assignee hereof and is fully incorporated herein by references for all purposes.

TECHNICAL FIELD

Certain embodiments of the present disclosure generally relate to wireless communication and, more particularly, to the control overhead of MAP information elements (MAP IEs) in orthogonal frequency-division multiplexing (OFDM) or orthogonal frequency division multiple access (OFDMA) frames.

BACKGROUND

OFDM and OFDMA wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station emits and receives radio frequency (RF) signals that convey data to and from the mobile stations. Such an RF signal from a base station includes an overhead load, in addition to the data load (voice and other data), for various communication management functions. Each mobile station processes the information in the overhead load of each received signal prior to processing the data.

Under the current versions of the IEEE 802.16x standards for the OFDM and OFDMA systems, every downlink subframe from a base station includes a preamble, a frame control header (FCH) following the preamble, and a downlink map (DL-MAP) following the FCH as part of the overhead load. The preamble includes information for searching a cell and a cell sector within a cell and for synchronizing a mobile station in both time and frequency with the received downlink signal. The FCH portion of the downlink subframe includes 24 bits with information on the downlink transmission format (e.g., the DL-MAP) and control information for the downlink data reception (e.g., allocation of the subcarriers in the current downlink frame). The DL-MAP specifies downlink data region allocation and burst profile information so that the DL data bursts in the OFDM/OFDMA frame may be correctly decoded. The first DL data burst is typically an uplink map (UL-MAP) containing similar allocation and burst profile information for uplink transmissions on a per-frame basis, which may also be considered as part of the control overhead.

The control overhead consumes both time and frequency resources in an OFDM or OFDMA frame, and the control messages grow with the number of concurrent users (e.g., mobile stations) supported by a base station. Because these time and frequency resources are limited on a per-frame basis, greater consumption of these resources by the control overhead means there are fewer resources for data traffic. Moreover, because most control messages are encoded with the lowest coding rate so that these messages may be reliably received by as many mobile stations as possible, a small increase in the size of the control messages leads to a considerably larger increase in the consumption of the frame resources. As a result of increasing control overhead, maximum data throughput of a mobile station will decrease exponentially as the number of concurrent users increases.

SUMMARY

Certain embodiments of the present disclosure generally relate to locating a burst within an orthogonal frequency-division multiplexing (OFDM) or orthogonal frequency division multiple access (OFDMA) frame without a MAP information element (MAP IE) in every OFDM or OFDMA frame such that the control overhead may be reduced.

Certain embodiments of the present disclosure provide a method for sticky region allocation. The method generally includes negotiating a capability for sticky region allocation; establishing a sticky-enabled connection in response to the capability negotiating; agreeing to or requesting an allocated data region for the sticky-enabled connection; receiving a first signal based on a first OFDM or OFDMA frame; locating the allocated data region in the first frame according to a first MAP IE; receiving a second signal based on a second OFDM or OFDMA frame, wherein the second signal is received later than the first signal; and locating the allocated data region in the second frame according to the first MAP IE without using a second MAP IE.

Certain embodiments of the present disclosure provide a computer-program apparatus for sticky region allocation comprising a computer-readable medium having instructions stored thereon, the instructions being executable by one or more processors. The instructions generally include instructions for negotiating a capability for sticky region allocation; instructions for establishing a sticky-enabled connection in response to the capability negotiating; instructions for agreeing to or requesting an allocated data region for the sticky-enabled connection; instructions for receiving a first signal based on a first OFDM or OFDMA frame; instructions for locating the allocated data region in the first frame according to a first MAP IE; instructions for receiving a second signal based on a second OFDM or OFDMA frame, wherein the second signal is received later than the first signal; and instructions for locating the allocated data region in the second frame according to the first MAP IE without using a second MAP IE.

Certain embodiments of the present disclosure provide an apparatus for sticky region allocation. The apparatus generally includes means for negotiating a capability for sticky region allocation; means for establishing a sticky-enabled connection in response to the capability negotiating; means for agreeing to or requesting an allocated data region for the sticky-enabled connection; means for receiving a first signal based on a first OFDM or OFDMA frame; means for locating the allocated data region in the first frame according to a first MAP IE; means for receiving a second signal based on a second OFDM or OFDMA frame, wherein the second signal is received later than the first signal; and means for locating the allocated data region in the second frame according to the first MAP IE without using a second MAP IE.

Certain embodiments of the present disclosure provide a mobile device. The mobile device generally includes negotiation logic configured to negotiate a capability for sticky region allocation; connection logic configured to establish a sticky-enabled connection in response to the capability negotiation; allocation logic configured to agree to or request an allocated data region for the sticky-enabled connection; a radio frequency (RF) front end for receiving a first signal based on a first OFDM or OFDMA frame and for receiving a second signal based on a second OFDM or OFDMA frame, wherein the second signal is received later than the first signal; and a MAP parser configured to locate the allocated data region in the first frame according to a first MAP IE and to locate the allocated data region in the second frame according to the first MAP IE without using a second MAP IE.

Certain embodiments of the present disclosure provide a method for sticky region allocation. The method generally includes negotiating a capability for sticky region allocation; establishing a sticky-enabled connection in response to the capability negotiating; allocating a data region based on the established sticky-enabled connection; transmitting a first signal based on a first OFDM or OFDMA frame having a MAP IE for locating the allocated data region in a starting OFDM or OFDMA frame; and transmitting a second signal based on a second OFDM or OFDMA frame without a MAP IE for locating the allocated data region in the second frame, wherein the second signal is transmitted later than the first signal and a signal based on the starting frame.

Certain embodiments of the present disclosure provide a computer-program apparatus for sticky region allocation comprising a computer-readable medium having instructions stored thereon, the instructions being executable by one or more processors. The instructions generally include instructions for negotiating a capability for sticky region allocation; instructions for establishing a sticky-enabled connection in response to the capability negotiating; instructions for allocating a data region based on the established sticky-enabled connection; transmitting a first signal based on a first OFDM or OFDMA frame having a MAP IE for locating the allocated data region in a starting OFDM or OFDMA frame; and instructions for transmitting a second signal based on a second OFDM or OFDMA frame without a MAP IE for locating the allocated data region in the second frame, wherein the second signal is transmitted later than the first signal and a signal based on the starting frame.

Certain embodiments of the present disclosure provide an apparatus for sticky region allocation. The apparatus generally includes means for negotiating a capability for sticky region allocation; means for establishing a sticky-enabled connection in response to the capability negotiating; means for allocating a data region based on the established sticky-enabled connection; means for transmitting a first signal based on a first OFDM or OFDMA frame having a MAP IE for locating the allocated data region in a starting OFDM or OFDMA frame; and means for transmitting a second signal based on a second OFDM or OFDMA frame without a MAP IE for locating the allocated data region in the second frame, wherein the second signal is transmitted later than the first signal and a signal based on the starting frame.

Certain embodiments of the present disclosure provide a base station. The base station generally includes negotiation logic configured to negotiate a capability for sticky region allocation; connection logic configured to establish a sticky-enabled connection in response to the capability negotiating; allocation logic configured to allocate a data region based on the established sticky-enabled connection; a transmitter front end configured to transmit a first signal based on a first OFDM or OFDMA frame having a MAP IE for locating the allocated data region in a starting OFDM or OFDMA frame and to transmit a second signal based on a second OFDM or OFDMA frame without a MAP IE for locating the allocated data region in the second frame, wherein the second signal is transmitted later than the first signal and a signal based on the starting frame.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIGS. 4A and 4B illustrate an example OFDM/OFDMA frame for Time Division Duplex (TDD) and the format of the Frame Control Header (FCH) contained therein, the FCH including downlink Frame Prefix (DLFP) information, in accordance with certain embodiments of the present disclosure.

DETAILED DESCRIPTION

Figure 1:
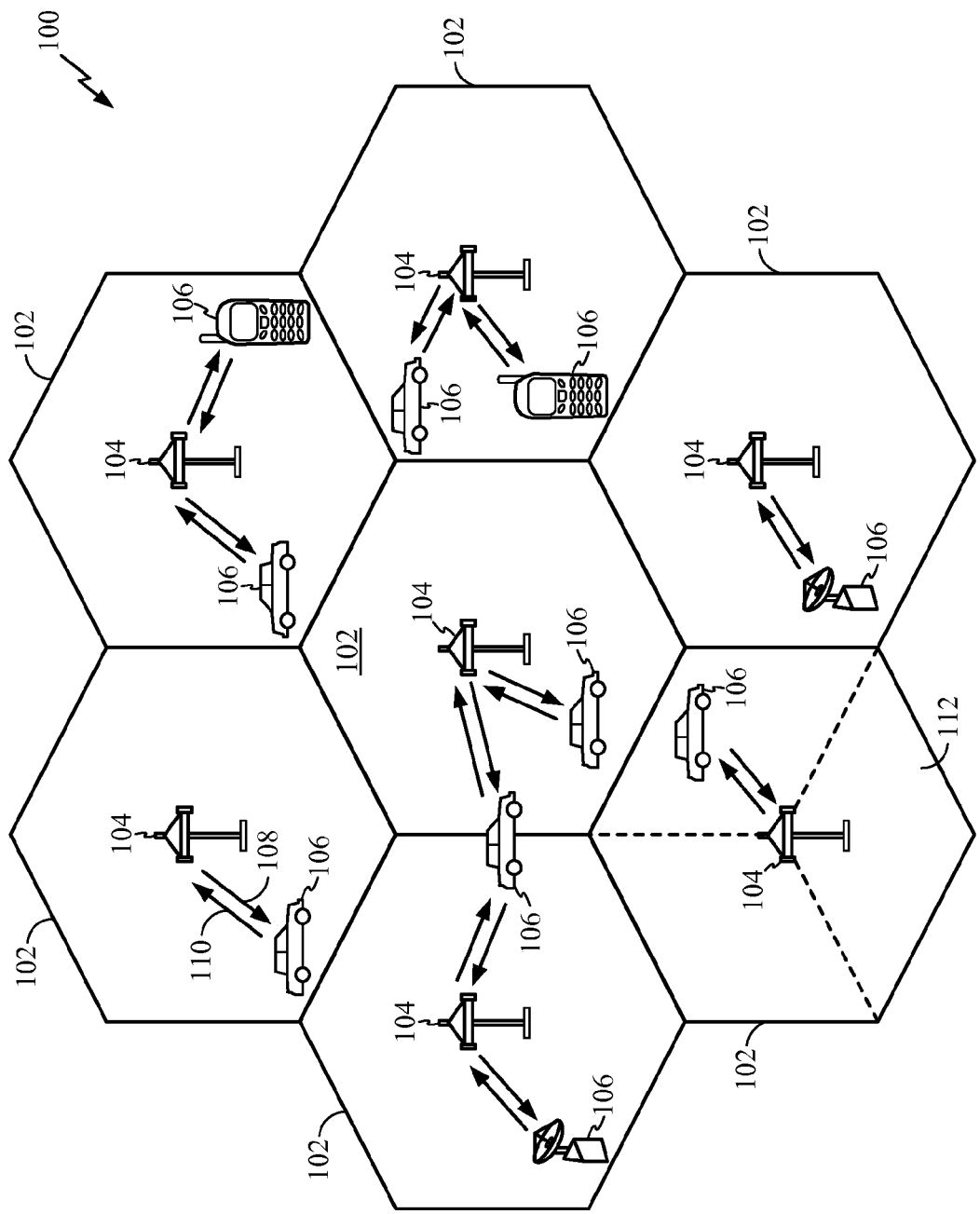
FIG. 1 illustrates an example wireless communication system, in accordance with certain embodiments of the present disclosure.

Certain embodiments of the present disclosure provide techniques and apparatus for allocating a fixed data region (termed "sticky region allocation") in an orthogonal frequency-division multiplexing (OFDM) or orthogonal frequency division multiple access (OFDMA) frame. With sticky region allocation, the sticky region may be agreed upon during the network entry (NE) procedures of OFDM/

OFDMA frame-based networks where a connection between a base station and a user terminal is established, and the base station may dynamically set up the sticky region by sending a single MAP information element (MAP IE) to inform the user terminal of the location and dimensions of the sticky region. Then, a user terminal can receive/send data bursts for a certain connection in multiple OFDM/OFDMA frames without needing a MAP IE for locating each burst in subsequent frames. The base station may only send another MAP IE when the allocation of the sticky region is to be modified or terminated. Accordingly, the size of the control overhead, such as the downlink (DL) and uplink (UL) MAP messages, may be reduced. The reduced control overhead may increase the frame resources available for data traffic and thus, may boost the overall efficiency and performance of OFDM/OFDMA wireless systems.

As used herein, a sticky region generally refers to a temporary fixed location within an OFDM/OFDMA frame occurring at a certain frame interval such that a user terminal (e.g., a mobile station) can locate a data burst within certain frames without the base station having to transmit this location information in an OFDM/OFDMA frame corresponding to each data burst. As used herein, "locating a data burst" may refer to either determining the location of a DL data burst within the DL subframe or positioning the location of a UL data burst within the UL subframe.

Exemplary Wireless Communication System

The methods and apparatus of the present disclosure may be utilized in a broadband wireless communication system. The term "broadband wireless" refers to technology that provides wireless, voice, Internet, and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility, and strong multipath immunity over conventional single carrier modulation schemes.

IEEE 802.16x is an emerging standard organization to define an air interface for fixed and mobile broadband wireless access (BWA) systems. IEEE 802.16x approved "IEEE P802.16-REVd/D5-2004" in May 2004 for fixed BWA systems and published "IEEE P802.16e/D12 October 2005" in October 2005 for mobile BWA systems. Those two standards defined four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
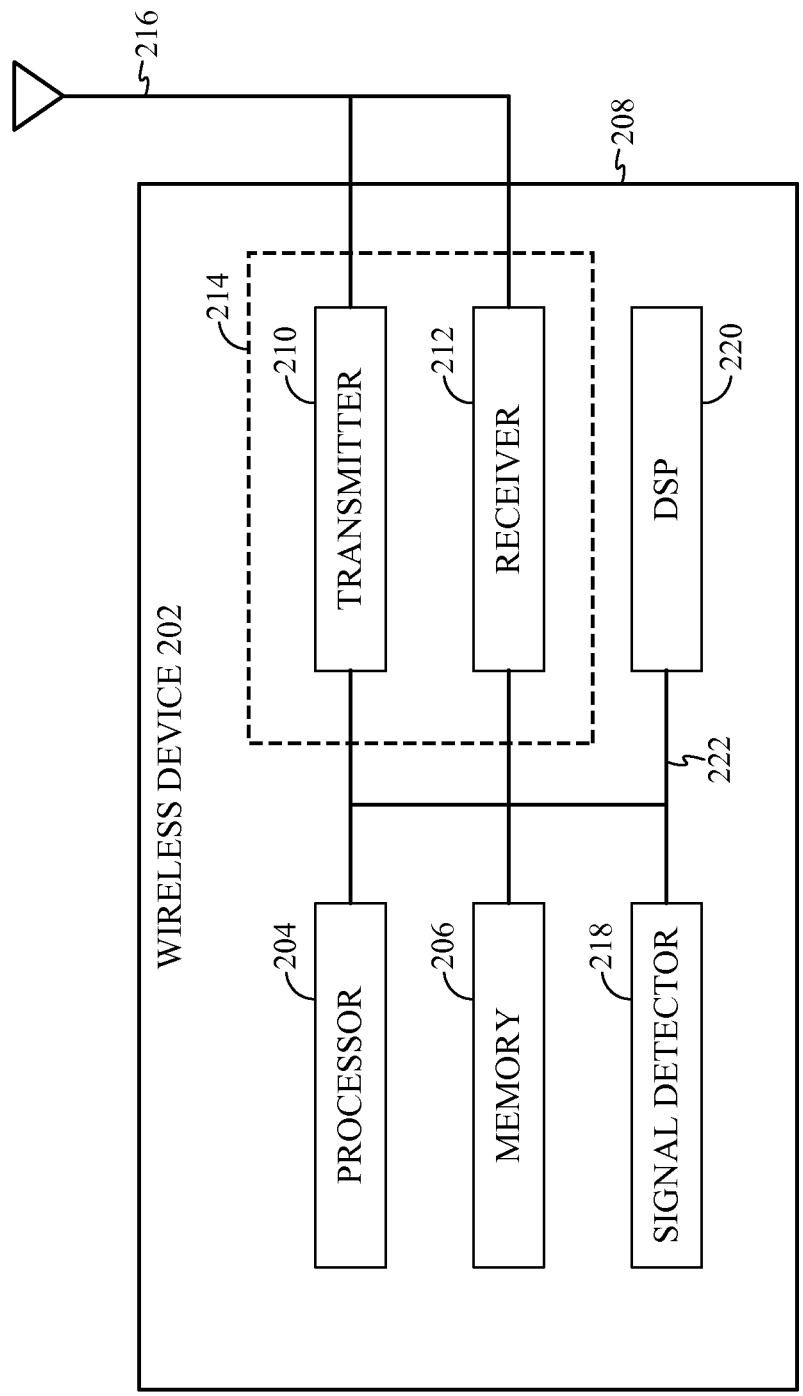
FIG. 2 illustrates various components that may be utilized in a wireless device in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
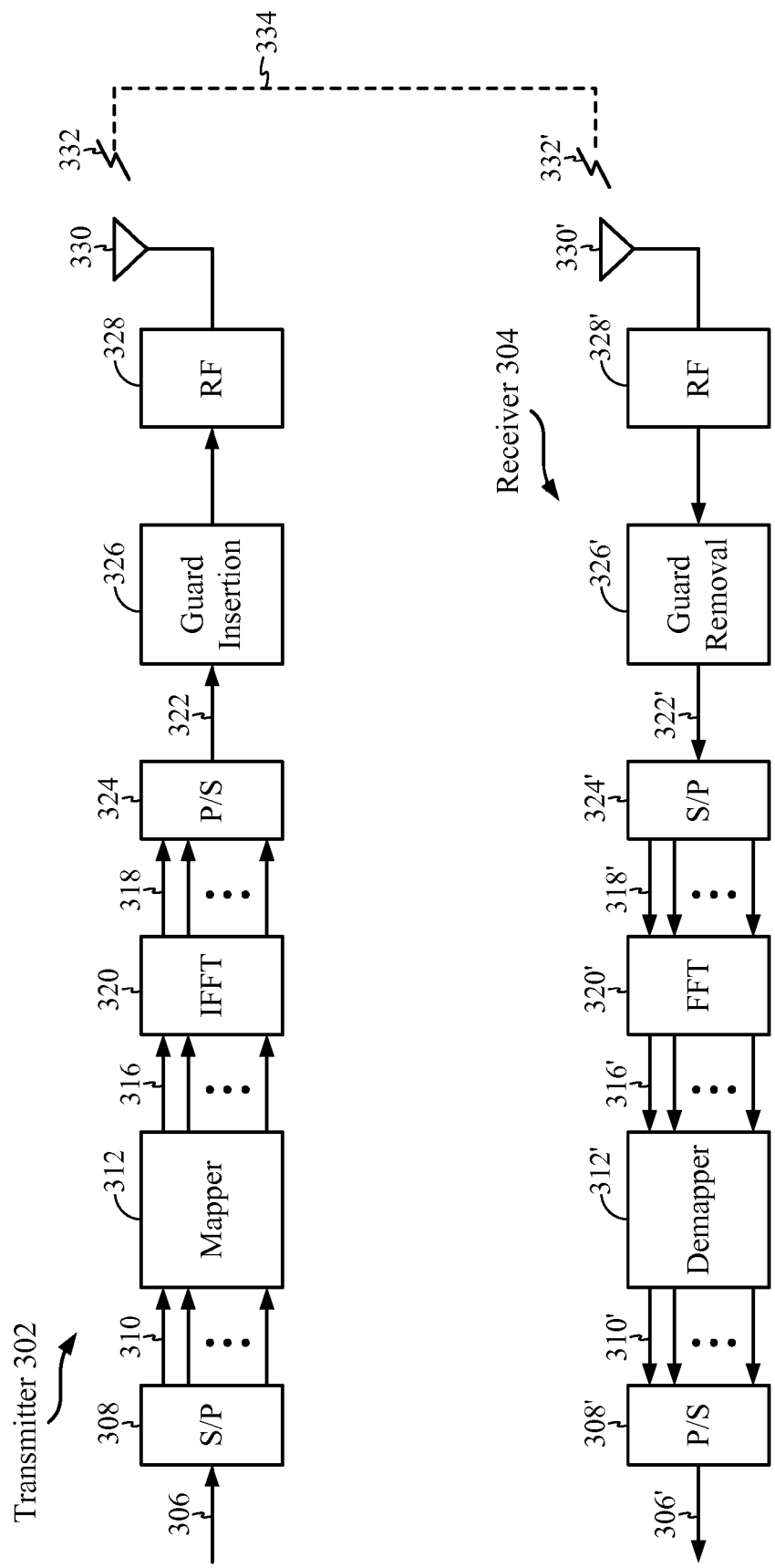
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary OFDM/OFDMA Frame

Figure 4A:
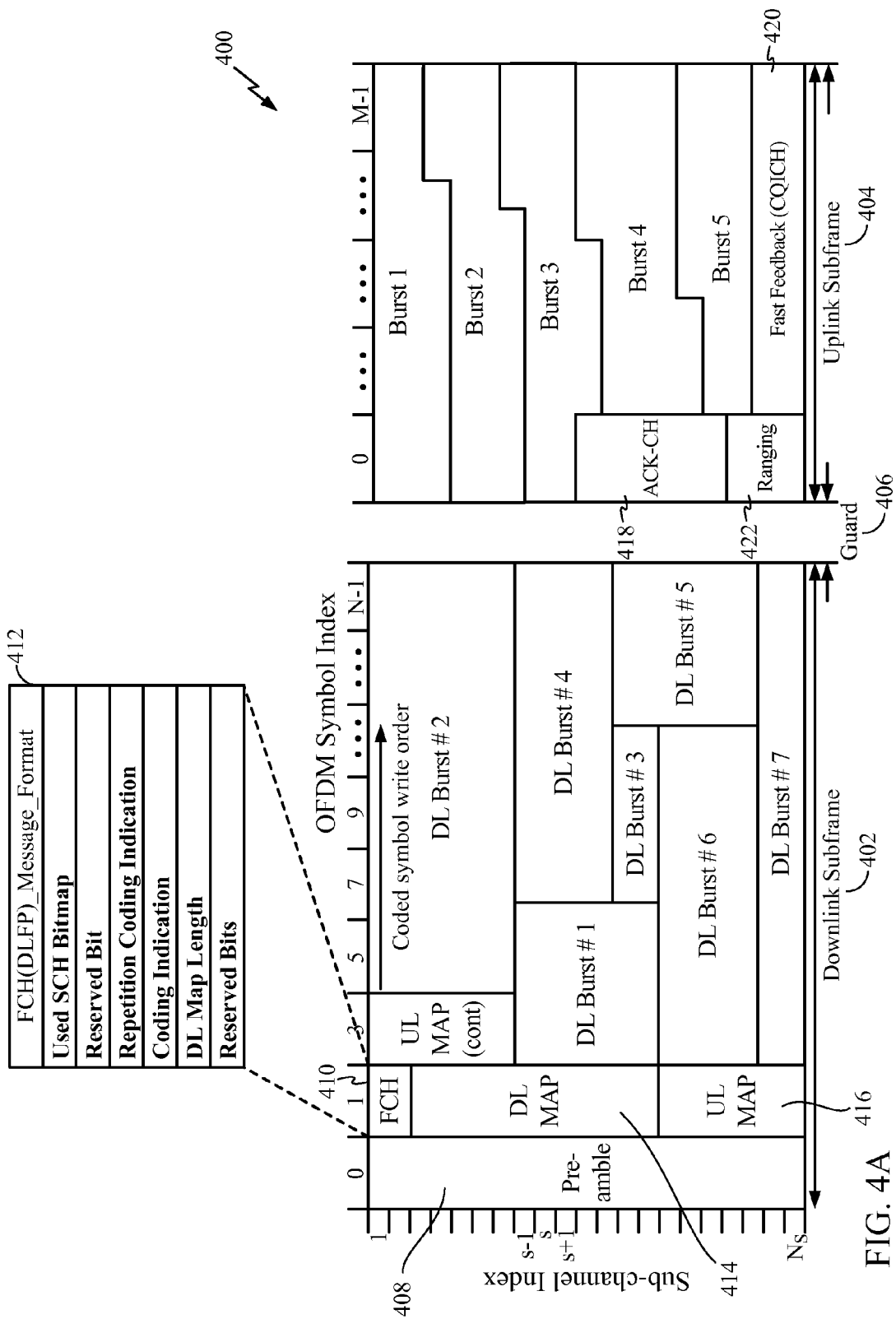

Referring now to FIG. 4A, an OFDM/OFDMA frame 400 for a Time Division Duplex (TDD) implementation is depicted as a typical, but not limiting, example. Other implementations of an OFDM/OFDMA frame, such as Full and Half-Duplex Frequency Division Duplex (FDD) may be used, in which case the frame is the same except that both downlink (DL) and uplink (UL) messages are transmitted simultaneously over different carriers. In the TDD implementation, each frame may be divided into a DL subframe 402 and a UL subframe 404, which may be separated by a small guard interval 406—or, more specifically, by Transmit/Receive and Receive/Transmit Transition Gaps (TTG and RTG, respectively)—in an effort to prevent DL and UL transmission collisions. The DL-to-UL-subframe ratio may be varied from 3:1 to 1:1 to support different traffic profiles.

Within the OFDM/OFDMA frame 400, various control information may be included. For example, the first OFDM/OFDMA symbol of the frame 400 may be a preamble 408, which may contain several pilot signals (pilots) used for synchronization. Fixed pilot sequences inside the preamble 408 may allow the receiver 304 to estimate frequency and phase errors and to synchronize to the transmitter 302. Moreover, fixed pilot sequences in the preamble 408 may be utilized to estimate and equalize wireless channels. The preamble 408 may contain BPSK-modulated carriers and is typically one OFDM symbol long. The carriers of the preamble 408 may be power boosted and are typically a few decibels (dB) (e.g., 9 dB) higher than the power level in the frequency domain of data portions in the WiMAX signal. The number of preamble carriers used may indicate which of the three segments of the zone are used. For example, carriers 0, 3, 6, . . . may indicate that segment 0 is to be used, carriers 1, 4, 7, . . . may indicate that segment 1 is to be used, and carriers 2, 5, 8, . . . may indicate that segment 2 is to be used.

A Frame Control Header (FCH) 410 may follow the preamble 408. The FCH 410 may provide frame configuration information, such as the usable subchannels, the modulation and coding scheme, and the MAP message length for the current OFDM/OFDMA frame. A data structure, such as the downlink Frame Prefix (DLFP) 412, outlining the frame configuration information may be mapped to the FCH 410.

As illustrated in FIG. 4B, the DLFP 412 for Mobile WiMAX may comprise six bits for the used subchannel (SCH) bitmap 412a, a reserved bit 412b set to 0, two bits for the repetition coding indication 412c, three bits for the coding indication 412d, eight bits for the MAP message length 412e, and four reserved bits 412f set to 0 for a total of 24 bits in the DLFP 412. Before being mapped to the FCH 410, the 24-bit DLFP may be duplicated to form a 48-bit block, which is the minimal forward error correction (FEC) block size.

Following the FCH 410, a DL-MAP 414 and a UL-MAP 416 may specify subchannel allocation and other control information for the DL and UL subframes 402, 404. In the case of OFDMA, multiple users may be allocated data regions within the frame, and these allocations may be specified in the DL and UL-MAP 414, 416. The MAP messages may include the burst profile for each user, which defines the modulation and coding scheme used in a particular link. Since MAP messages contain critical information that needs to reach all users, the DL and UL-MAP 414, 416 may often be sent over a very reliable link, such as BPSK or QPSK with rate ½ coding and repetition coding. The DL subframe 402 of the OFDM/OFDMA frame may include DL bursts of various bit lengths containing the downlink data being communicated. Thus, the DL-MAP 414 may describe the location of the bursts contained in the downlink zones and the number of downlink bursts, as well as their offsets and lengths in both the time (i.e., symbol) and the frequency (i.e., subchannel) directions.

Likewise, the UL subframe 404 may include UL bursts of various bit lengths composed of the uplink data being communicated. Therefore, the UL-MAP 416, transmitted as the first burst in the downlink subframe 402, may contain information about the location of the UL burst for different users. The UL subframe 404 may include additional control information as illustrated in FIG. 4A. The UL subframe 404 may include a UL ACK 418 allocated for the mobile station (MS) to feed back a DL hybrid automatic repeat request acknowledge (HARQ ACK) and/or a UL CQICH 420 allocated for the MS to feed back channel state information on the Channel Quality Indicator channel (CQICH). Furthermore, the UL subframe 404 may comprise a UL Ranging subchannel 422. The UL Ranging subchannel 422 may be allocated for the MS to perform closed-loop time, frequency, and power adjustment, as well as bandwidth requests. Altogether, the preamble 408, the FCH 410, the DL-MAP 414, and the UL-MAP 416 may carry information that enables the receiver 304 to correctly demodulate the received signal.

For OFDMA, different "modes" can be used for transmission in DL and UL. An area in the time domain where a certain mode is used is generally referred to as a zone. One type of zone is called DL-PUSC (downlink partial usage of subchannels) and may not use all the subchannels available to it (i.e., a DL-PUSC zone may only use particular groups of subchannels). There may be a total of six subchannel groups, which can be assigned to up to three segments. Thus, a segment can contain one to six subchannel groups (e.g., segment 0 contains three subchannel groups, segment 1 contains two, and segment 2 contains one subchannel group). Another type of zone is called DL-FUSC (downlink full usage of subchannels). Unlike DL-PUSC, DL-FUSC does not use any segments, but can distribute all bursts over the complete frequency range.

Exemplary DL-MAP and DL-MAP IEs

Figure 5:
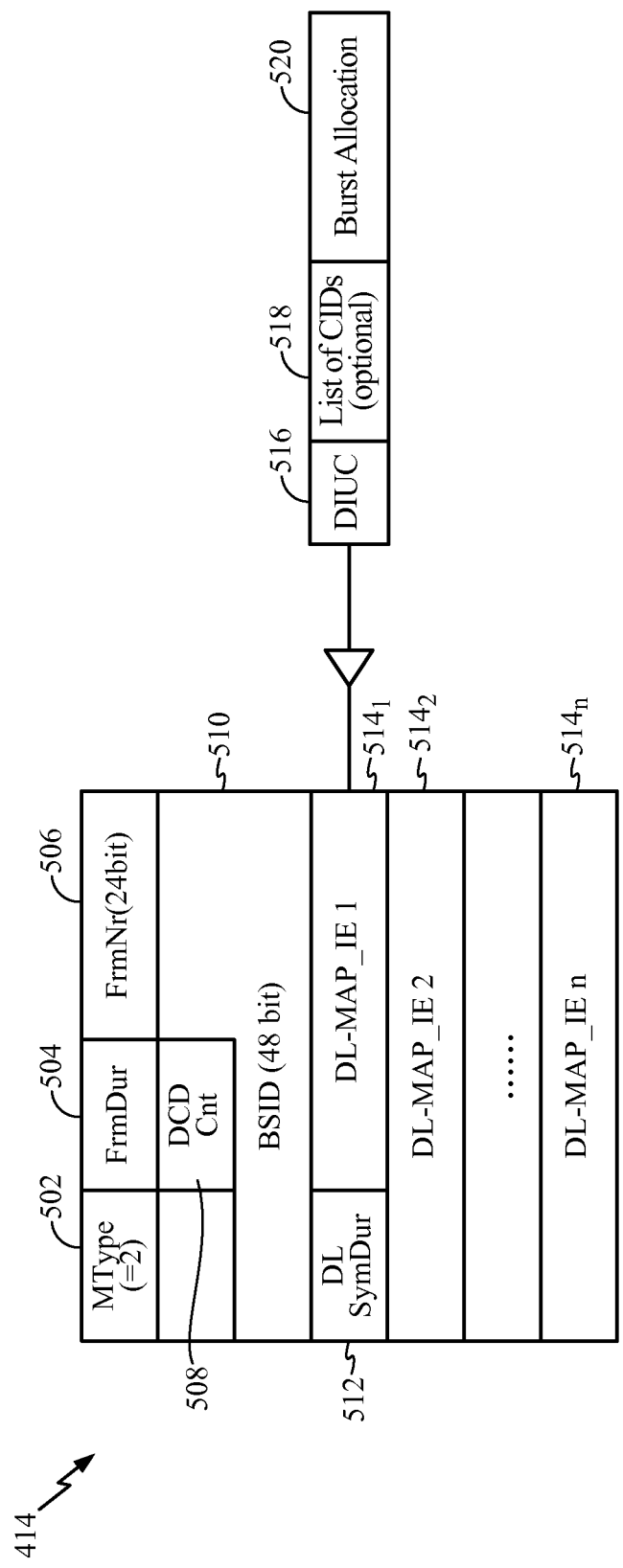
FIG. 5 illustrates the format of a downlink map (DL-MAP) message with a generic DL-MAP information element (IE), in accordance with certain embodiments of the present disclosure.

The DL-MAP 414 of FIG. 4A is illustrated in more detail in FIG. 5. The DL-MAP 414 may begin with a Management Message Type 502 having a length of 8 bits, which has a value of 2 ($00000010_b$) to indicate the control message is a DL-MAP. The Management Message Type 502 may be followed by a frame duration code 504, which is 8 bits long, and a frame number 506, which is 24 bits long. The frame number 506 may be followed by a Downlink Channel Descriptor (DCD) count 508 having a length of 8 bits and matching the DCD configuration change count value. The DCD message refers to physical and Media Access Control (MAC) layer-related parameters to be applied to each burst interval allocated to the downlink, which include a modulation type, a forward error correction (FEC) code type, and the like. The DCD count 508 may be followed by a base station identifier (BSID) 510, having a length of 6 bytes for a total length of 48 bits. The BSID 510 may uniquely identify the network base station and may be followed by a DL symbol duration 512 indicating a number of OFDMA symbols in the DL subframe 402 and having a length of 8 bits.

A number (n) of DL-MAP information elements (IEs) 514 having variable lengths may follow the DL symbol duration 512. A generic DL-MAP IE 514 may comprise a Downlink Interval Usage Code (DIUC) 516, a list of connection IDs 518, and the DL burst allocation 520 (e.g., subchannel offset, symbol offset, subchannel number, and symbol number) to define a downlink transmission. A DIUC 516 between 0 and 12 inclusive may indicate that the DL-MAP IE provides a DL burst profile (i.e., the modulation and coding scheme used in the burst), while a DIUC 516 of 14 or 15 may indicate that the DL-MAP IE is a control information element. A DIUC 516 of 13 may indicate that the DL-MAP IE is used for safety zones (i.e., gap) and peak-to-average-power ratio (PAPR) reduction. Although not shown in FIG. 5, some embodiments of the DL-MAP 414 may include padding having a length of 4 bits in an effort to reach a byte boundary for the DL-MAP 414.

Exemplary Sticky Region Allocation

In an effort to reduce the control overhead (i.e., the size of the DL-MAP 414 and/or the UL-MAP 416) in subsequent frames such that more frame resources can be used for data traffic, some earlier solutions have proposed changing the standard MAP message formats according to the WiMAX standard (e.g., IEEE 802.16e) by introducing new MAP IEs for allocating, modifying, and terminating a sticky region. While these solutions significantly reduce the control overhead, introducing new MAP IEs or other new MAP messages typically requires a change to the WiMAX standard such that both base stations and mobile stations may benefit from the reduced control overhead in OFDM/OFDMA frames, especially as a mobile station moves from cell to cell with different serving base stations. Accordingly, what is needed are techniques and apparatus for reducing the control overhead in OFDM/OFDMA frames without requiring substantial changes, if any, to the WiMAX standard.

Figure 6:
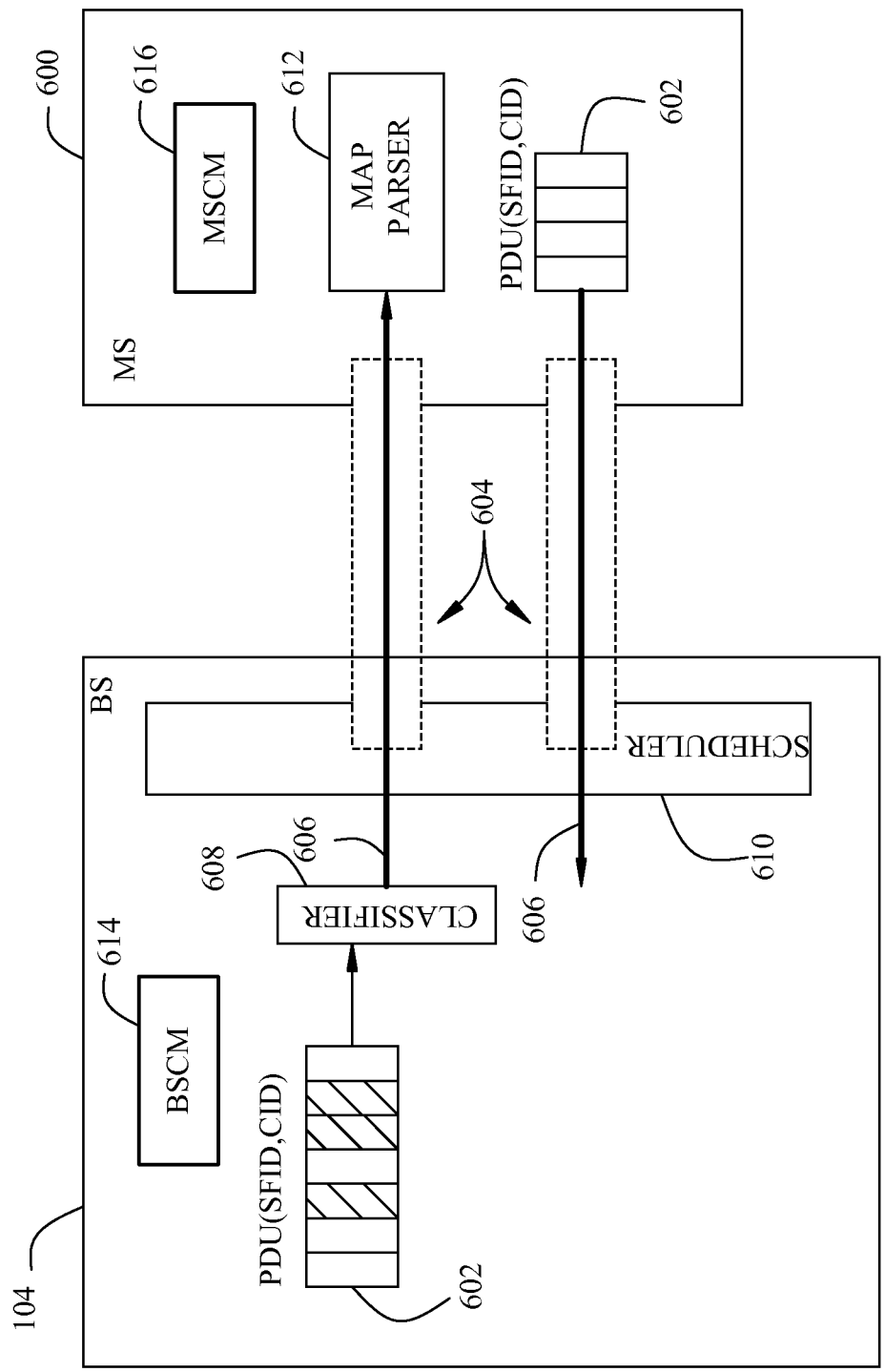
FIG. 6 illustrates connections with service flows between a base station and a mobile station, in accordance with certain embodiments of the present disclosure.

Before delving into the details of sticky region allocation according to certain embodiments of the present disclosure, FIG. 6 illustrates connections with service flows between a base station (BS) 104 and a mobile station (MS) 600. Before any data packets, such as protocol data units (PDUs) 602, are transmitted between the two devices, one or more unidirectional logical links called connections 604 may be established between the base station 104 and the mobile station 600. Establishing a connection 604 may include the steps of ranging, negotiating capabilities, and registering according to the WiMAX standard, as described in greater detail below. FIG.

6 illustrates two established connections 604. Each connection 604 may be assigned a particular connection identifier (CID).

Once a connection 604 is established, the outbound Media Access Control (MAC) may then associate packets traversing the MAC interface into a service flow 606 to be delivered over the connection. Each service flow 606 may be assigned a particular service flow identifier (SFID). The Quality of Service (QoS) parameters associated with the service flow 606 may dictate the transmission ordering and scheduling on the air interface of the connection. These service flow parameters may be dynamically managed through MAC messages (e.g., DSA-REQ and DSA-RSP) to accommodate the dynamic service demand. In other words, the base station 104 and the mobile station 600 may utilize a service flow 606 with an appropriate QoS class, bandwidth, and delay to ensure that application data receives QoS treatment appropriate for the application. The QoS mechanism may apply to both DL and UL directions in an effort to provide suitable QoS in both directions.

One type of QoS class or category for Mobile WiMAX is the Unsolicited Grant Service (UGS). UGS is defined to support real-time data streams comprising fixed-size data packets at periodic intervals, which eliminates the overhead and latency of mobile station requests and assures that grants are available to meet the service flow's real-time needs. UGS is typically used for applications such as Voice over Internet Protocol (VoIP) and T1/E1 transport. Because of the fixed-size of the data bursts and the periodicity, UGS is a good candidate to benefit from sticky region allocation according to embodiments of the present disclosure described below.

To achieve the appropriate QoS, a classifier 608 within the base station 104 may classify the PDUs 602, which may contain SFIDs and CIDs, according to classifier information, such as the assigned QoS parameters. PDUs 602 are mapped to MAC service data units (SDUs). Classification is the process by which a MAC SDU mapped onto a particular transport connection for transport between MAC peers. The mapping process associates a MAC SDU with a transport connection, which also creates an association with the service flow characteristics of that connection. This process facilitates the delivery of MAC SDUs with the appropriate QoS constraints. The classifier 608 may then send the classified PDUs to a scheduler 610.

The base station scheduler 610 may determine the appropriate data rate (or burst profile) for each burst allocation. The scheduler 610 may base its decisions on the buffer size, channel propagation conditions at the receiver, and/or relevant channel-state information fed back by the Channel Quality Indicator Channel (CQICH) 420. The channel-state information may include, for example, the physical channel-to-interference-plus-noise ratio (CINR) or the effective CINR. Therefore, using the classifier 608 and the scheduler 610, the base station 104 may determine the traffic characteristics based on signaling messages and classifier information.

After being classified and scheduled, the PDUs 602 at the MAC layer may be manipulated at the base station 104 by a MAP builder (not shown) operating at the physical layer (PHY) to construct the OFDM or OFDMA frames according to scheduling information from the scheduler 610. Signals based on the constructed OFDM or OFDMA frames are broadcast by the base station 104 and received by the mobile station 600. At the mobile station 600, the received signals may be processed such that a MAP parser 612, for example, may locate data bursts within each DL subframe 402 according to the DL-MAP 414 and the DL-MAP IEs 514 contained therein. The MAP parser 612 may also determine the location for one or more data bursts in the UL subframe 404 according to the UL-MAP 416, whereby a MAP builder within the mobile station 600 may schedule a UL data burst for transmission in the uplink direction.

According to certain embodiments of the present disclosure, the call managers or schedulers at the mobile station 600 and the base station 104 may determine the traffic characteristics based on the signaling messages and classifier information. This determination may occur during or just after establishing a connection with those traffic characteristics. Once the base station 104 and the mobile station 600 agree to allocate a sticky region for a particular connection 604, the base station MAP builder and the mobile station MAP parser 612 may be informed by, for example, the base station call manager (BSCM) 614 and the mobile station call manager (MSCM) 616, respectively.

For the first communication data for this particular connection 604 supporting sticky region allocation, the MAP builder may generate a MAP IE located in the DL-MAP 414 or the UL-MAP 416 of the OFDM or OFDMA frame 400. This MAP IE may not only indicate the location, time duration, frequency bandwidth, and modulation of the data burst within the frame, but may also trigger sticky region allocation for subsequent data for this connection. For the downlink, for example, the MAP parser 612 may locate the MAP IE within the data on the sticky-supported connection 604 and may inform the decoder (e.g., demapper 312') of the location, time and frequency dimensions, and modulation parameters so that the decoder may automatically decode data from the allocated sticky region in subsequent OFDM/OFDMA frames according to the established frame interval. Thereafter, the base station MAP builder need not include a MAP IE for data bursts for this particular connection 604, and the MAP builder for the base station or the mobile station may continue to position data bursts for this particular connection at the same location in the OFDM/OFDMA frame. Therefore, when a subsequent OFDM/OFDMA frame is received, the mobile station 600 will know where to locate the data burst without receiving another MAP IE.

This principle is generally referred to herein as sticky region allocation. Another MAP IE for the sticky region may only be transmitted in the DL-MAP 414 or UL-MAP 416 if the size and/or location of the allocated sticky region is being modified or terminated. In this manner, the size of the DL-MAP 414 or the UL-MAP 416, and thus the control overhead, may be reduced without modifying standard MAP IEs.

Exemplary Signal Transmission Using Sticky Region Allocation

Figure 7:
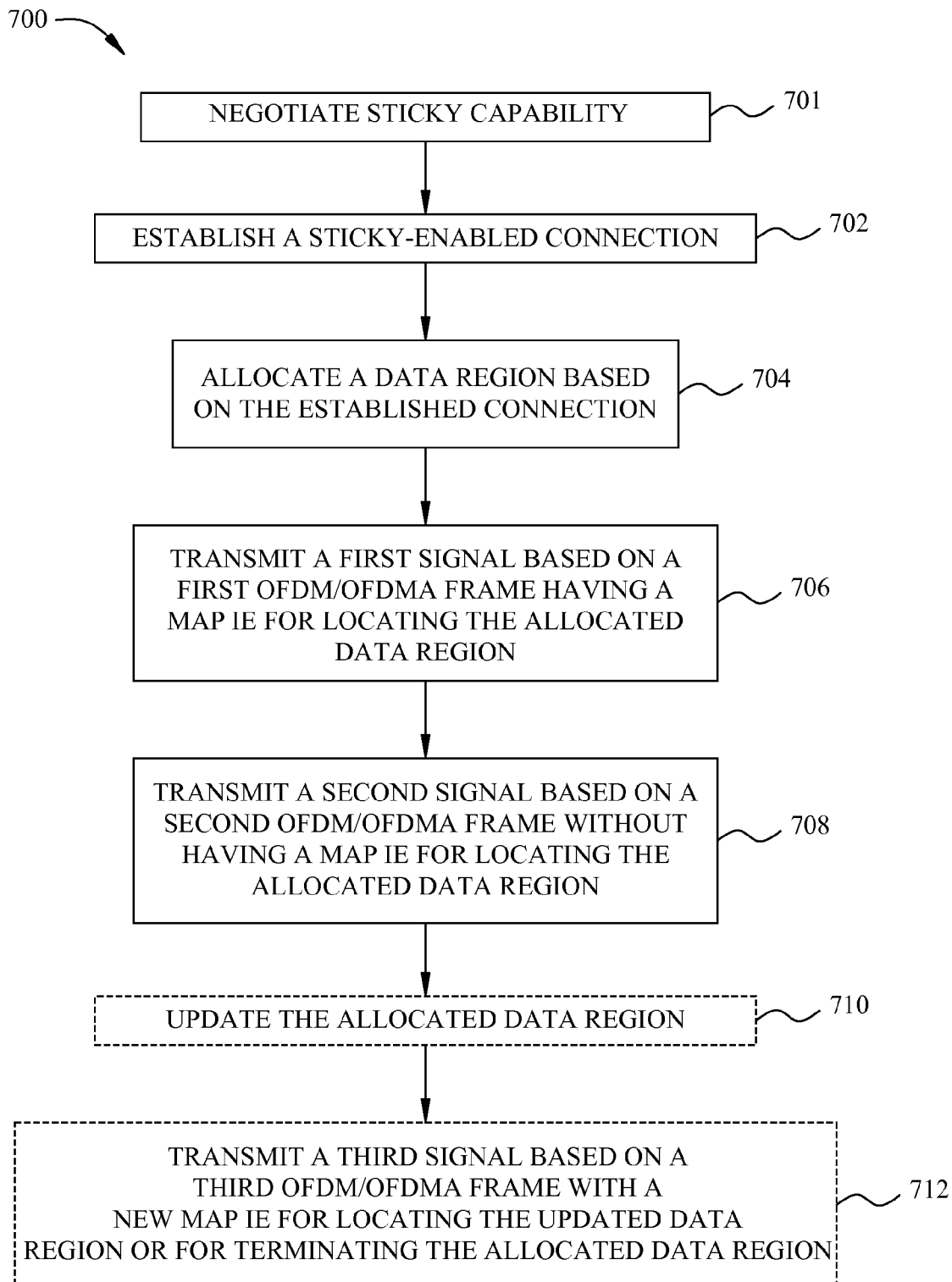
FIG. 7 is a flow chart of example operations for transmitting signals based on OFDM or OFDMA frames using sticky region allocation, in accordance with certain embodiments of the present disclosure.

FIG. 7 is a flow chart of example operations 700 for transmitting signals based on OFDM or OFDMA frames using sticky region allocation from the perspective of a base station, for example. The operations 700 are only concerned with connections that support and utilize sticky region allocation, meaning that both a base station 104 and a mobile station 600 support and agree to use sticky region allocation capability during basic capability negotiation. As used herein, "locating the allocated data region" may refer either to finding the location of a DL data burst within the DL subframe 402 or to positioning a UL data burst within the UL subframe 404. Furthermore, the operations 700 are only concerned with a single sticky region for clarity, although multiple sticky regions may be allocated with different OFDM/OFDMA frame positions.

Network entry (NE) procedures may comprise operations for ranging, negotiating basic capabilities, and registering. The operations 700 may begin, at 701, by determining whether the capability for sticky region allocation is supported by the mobile station 600 during basic capabilities negotiation of the NE procedures. After negotiating sticky capability at 701, a sticky-enabled connection 604 may be established at 702 between the base station 104 and the mobile station 600. For some embodiments, establishing the connection may include dynamic service flow additions or modifications, which may comprise sending requests or sending responses to received requests (e.g., DSA-REQ and DSA-RSP messages).

At 704, a data region may be allocated based on the established connection. This sticky data region may be allocated based on the traffic characteristics (e.g., the QoS) from signaling messages and classifier information when the connection 604 was established, as described above. Furthermore, the frame interval for OFDM/OFDMA frames that include the sticky region data may depend on the QoS parameters and may be specified in a Dynamic Service Addition Request (DSA-REQ) message by using a vendor-specific type length value (TLV) or a new TLV in future standards. This sticky frame interval may be varied depending on the QoS requirements of the connection 604. Provided for DL or UL data traffic, the sticky region may be allocated during or after the establishment of the connection. For some embodiments, the sticky region may be allocated just before the first MAP IE for the sticky-enabled connection is transmitted.

At 706, a first signal based on a first OFDM/OFDMA frame may be transmitted in a starting OFDM/OFDMA frame, which may be the first frame or a subsequent OFDM/OFDMA frame. This first OFDM/OFDMA frame may contain a MAP IE for locating the allocated data region, either within the first frame or a subsequent frame. Structured similarly to a MAP IE conforming to the Mobile WiMAX standard (IEEE 802.16e), this MAP IE may function to trigger sticky region allocation, as described above.

At 708, a second signal based on a second OFDM/OFDMA frame may be transmitted. This second OFDM/OFDMA frame need not include a MAP IE for locating the allocated data region. This is because the receiving device, such as a mobile station 600, may most likely be able to locate the allocated data region according to the receiving device's knowledge of the sticky region based on the location information from the previous MAP IE transmitted at 706 and the frame interval for the allocated data region from the DSA-REQ. A base station 104, for example, may transmit the first and the second signals.

The base station 104 need not transmit a MAP IE in every frame or in every frame where the sticky region appears; rather, the base station may transmit a MAP IE only when the sticky region is being modified or terminated. To modify the location, duration, bandwidth, and/or modulation of the sticky region, for example, the base station may update the allocated sticky region at 710 and transmit a new MAP IE with the new information at 712. As an option at 712, the sticky region may be terminated when the base station transmits a new MAP IE having a value of zero for the field for the number of OFDM/OFDMA symbols. Therefore, the sticky region allocation may be dynamically initiated and flexibly adjusted depending on the ever-changing traffic conditions.

Conventionally, each data burst in an OFDM/OFDMA frame has a corresponding MAP IE, located in the same frame or in a preceding frame. The advantage of being able to transmit signals based on an OFDM/OFDMA frame without one or more MAP IEs for locating corresponding data bursts is that the size of the DL-MAP 414 and/or UL-MAP 416 decreases. When the control overhead is reduced, the data throughput may be increased. Even a small reduction in the size of the DL-MAP or the UL-MAP may have a significant impact on the available resources for data traffic since the DL-MAP and UL-MAP may be transmitted at the lowest coding rate as described above.

Figure 7A:
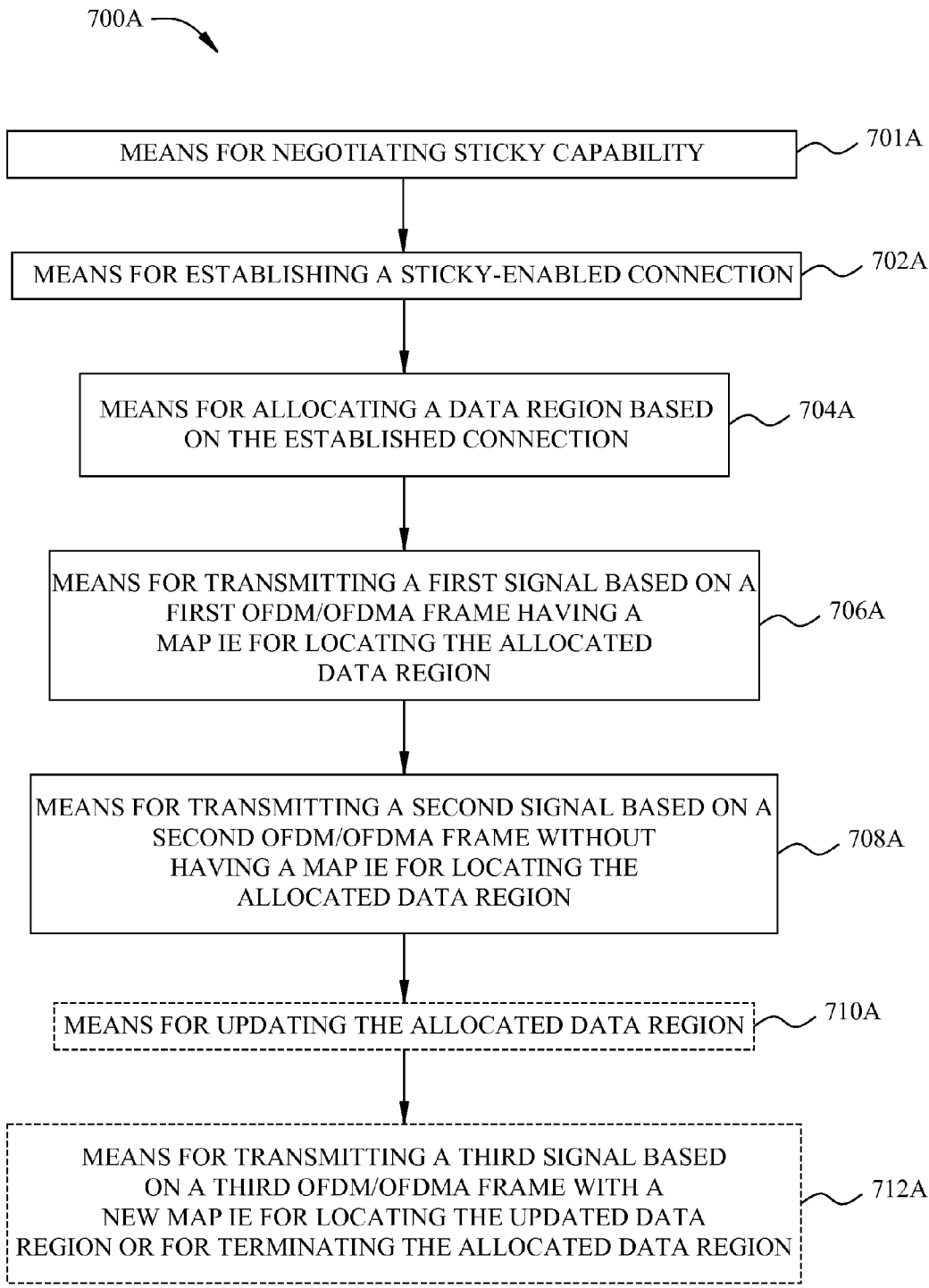
FIG. 7A is a block diagram of means corresponding to the example operations of FIG. 7 for transmitting signals based on OFDM or OFDMA frames using sticky region allocation, in accordance with certain embodiments of the present disclosure.

The operations 700 of FIG. 7 described above may be performed by various hardware and/or software component(s) and/or module(s) corresponding to the means-plus-function blocks 700A illustrated in FIG. 7A. In other words, blocks 702 through 712 illustrated in FIG. 7 correspond to means-plus-function blocks 702A through 712A illustrated in FIG. 7A.

Exemplary Signal Reception Using Sticky Region Allocation

Figure 8:
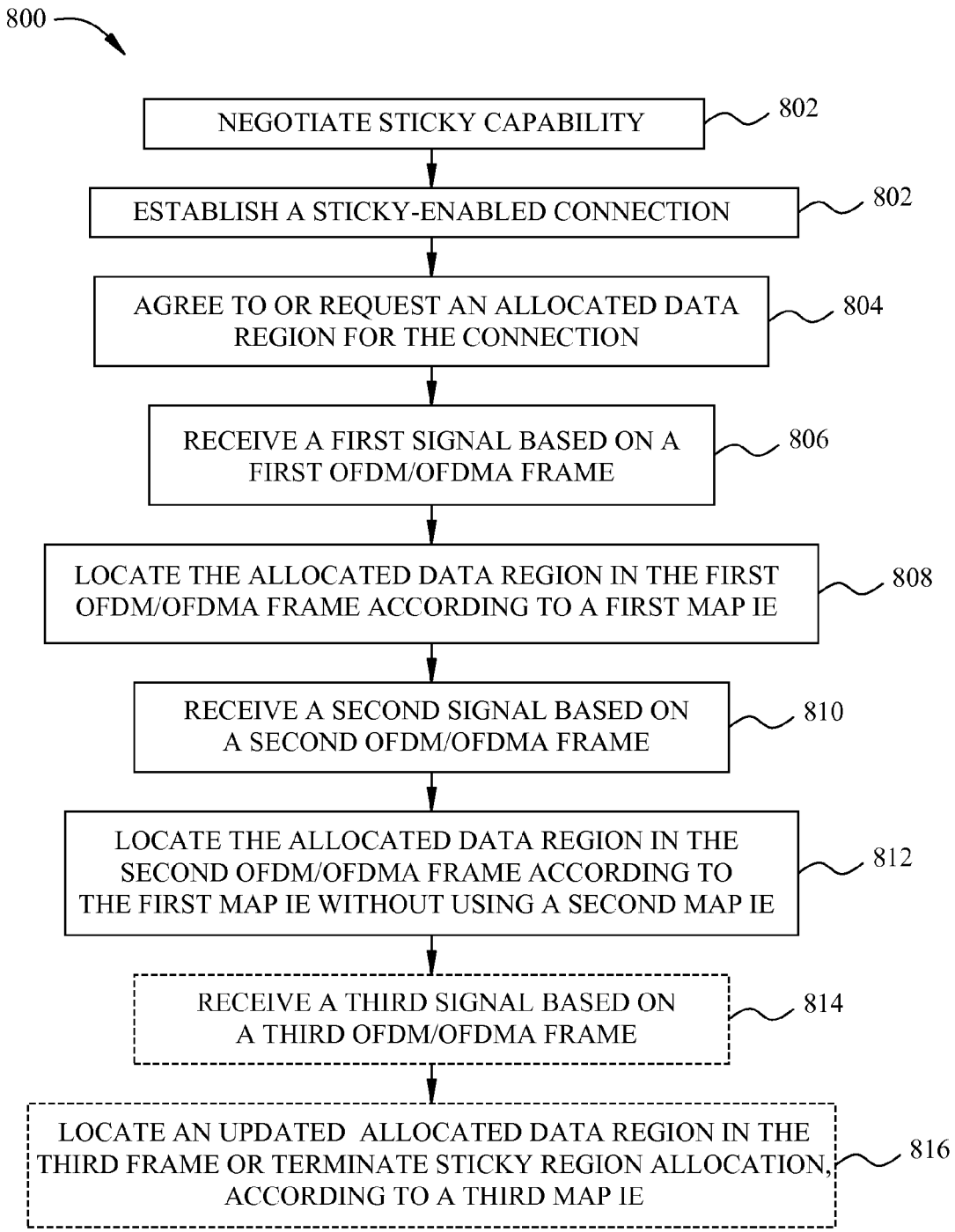
FIG. 8 is a flow chart of example operations for receiving signals based on OFDM or OFDMA frames using sticky region allocation, in accordance with certain embodiments of the present disclosure.

FIG. 8 is a flow chart of example operations 800 for receiving signals based on OFDM or OFDMA frames using sticky region allocation from the perspective of a mobile station, for example. The operations 800 are only concerned with connections that support and utilize sticky region allocation, meaning that both a mobile station 600 and a base station 104 support and agree to use sticky region allocation capability during basic capability negotiation. As used herein, "locating the allocated data region" may refer either to finding the location of a DL data burst within the DL subframe 402 or to positioning a UL data burst within the UL subframe 404. Furthermore, the operations 800 are only concerned with a single sticky region for clarity, although multiple sticky regions may be allocated with different OFDM/OFDMA frame positions.

The operations 800 may begin, at 801, by determining whether the capability for sticky region allocation is supported by the base station 104 during basic capabilities negotiation of the NE procedures. After negotiating sticky capability at 801, a sticky-enabled connection 604 may be established at 802 between the base station 104 and the mobile station 600. For some embodiments, establishing the connection may include dynamic service flow additions or modifications, which may comprise sending requests or sending responses to received requests.

At 804, the receiving device, such as a mobile station 600, may agree to or request an allocated data region for the established connection. This sticky data region may be allocated based on the traffic characteristics (e.g., the QoS) from signaling messages and classifier information when the connection 604 was established, as described above. Provided for DL or UL data traffic, the sticky region may be allocated during or after the establishment of the connection.

At 806, a first signal based on a first OFDM/OFDMA frame may be received. At 808, the allocated data region, such as a DL or UL data burst, may be located in the first OFDM/OFDMA frame according to a first MAP IE. The first MAP IE may have been decoded from the first OFDMA frame or from a previously received OFDM/OFDMA frame. This first MAP IE may function to trigger sticky region allocation and may not deviate from a typical MAP IE following the Mobile WiMAX standard (IEEE 802.16e), as described above.

A second signal based on a second OFDMA frame may be received at 810. At 812, the allocated data region may be located in the second OFDMA frame without using a second MAP IE. In other words, the allocated data region may be located based on the first MAP IE, which may have been a sticky region MAP IE. Conventionally, mobile stations needed a second MAP IE to locate the data region in the second OFDMA frame.

Optionally, a third signal based on a third OFDM/OFDMA frame may be received at 814. At 816, an updated allocated data region may be located in the third frame according to a third MAP IE, where the third MAP IE may be located in the third frame or in a previously received frame. For example, the updated data region may be updated in terms of location, duration, bandwidth, and/or modulation from the previously allocated data region. As an option at 816, the third MAP IE may indicate terminating sticky region allocation for the present allocated data region, at least until another sticky region is allocated.

Figure 8A:
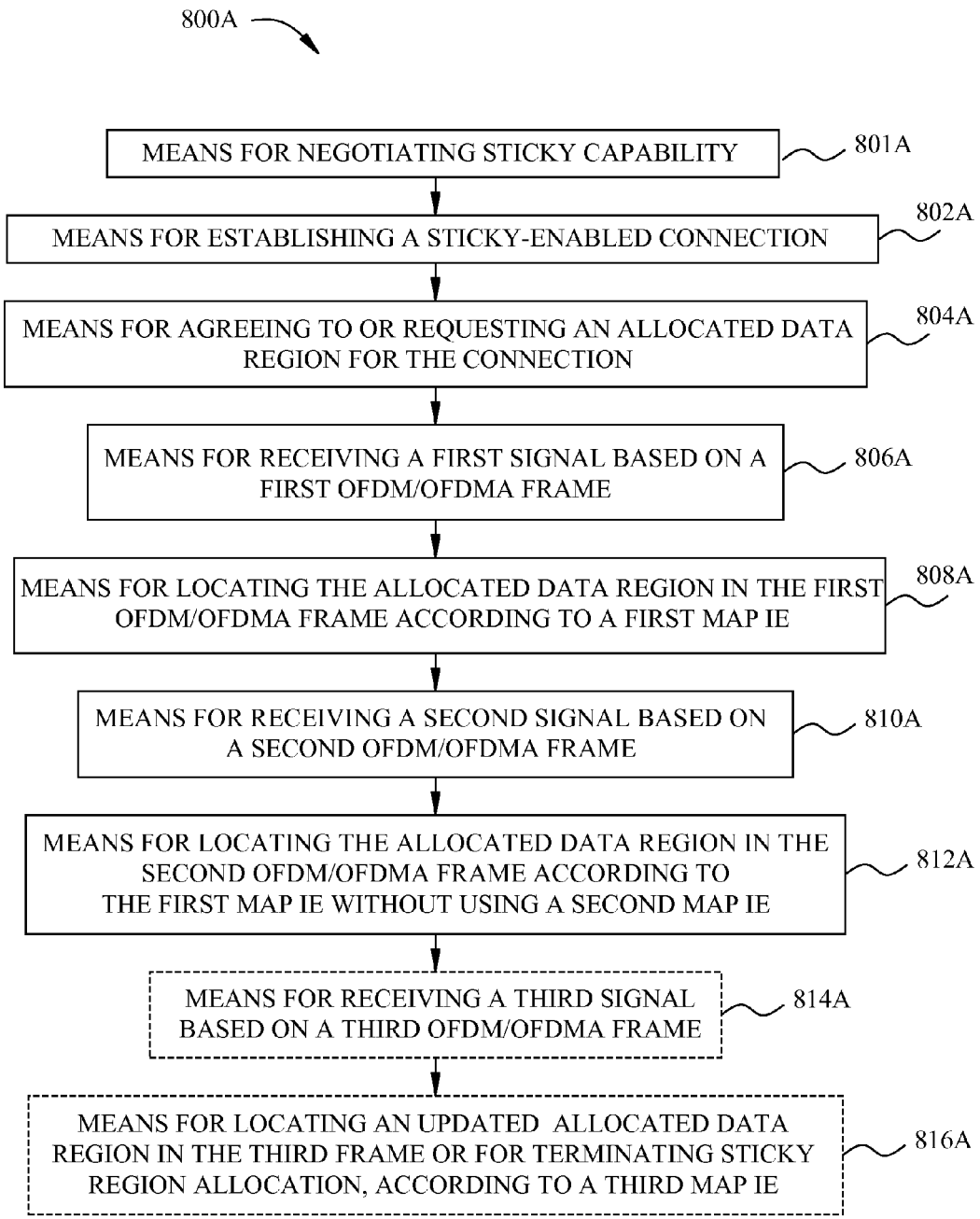
FIG. 8A is a block diagram of means corresponding to the example operations of FIG. 8 for receiving signals based on OFDMA or OFDMA frames using sticky region allocation, in accordance with certain embodiments of the present disclosure.

The operations 800 of FIG. 8 described above may be performed by various hardware and/or software component(s) and/or module(s) corresponding to the means-plus-function blocks 800A illustrated in FIG. 8A. In other words, blocks 802 through 816 illustrated in FIG. 8 correspond to means-plus-function blocks 802A through 816A illustrated in FIG. 8A.

Exemplary Network Entry for Sticky Region Allocation

Figure 9A:
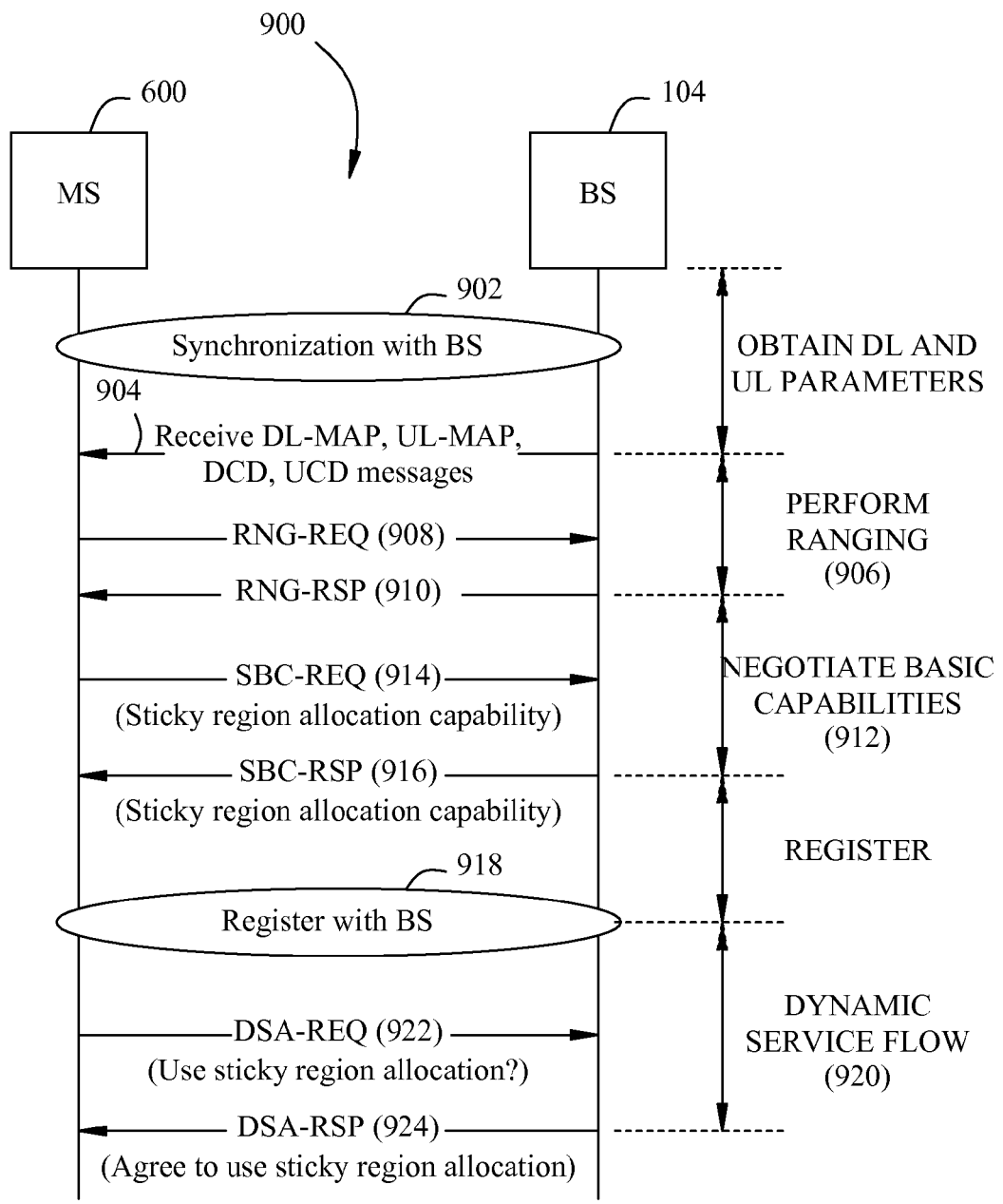
FIGS. 9A-9B illustrate example network entry (NE) procedures with provisions for sticky region allocation, in accordance with certain embodiments of the present disclosure.

FIG. 9A illustrates an example network entry (NE) procedure 900 with provisions for sticky region allocation, according to certain embodiments of the present disclosure. The NE procedure 900 may be performed before establishing a sticky-enabled transport connection between a mobile station (MS) 600 and a base station (BS) 104. At 902, the mobile station 600 may synchronize with the base station 104 by using pilot signals of the preamble 408, for example. At 904, the mobile station 600 may obtain DL and UL parameters. For example, the mobile station may receive DL-MAP, UL-MAP, Downlink Channel Descriptor (DCD), and Uplink Channel Descriptor (UCD) messages broadcast by the base station 104.

At 906, initial ranging may be performed. For example, the mobile station may transmit a Ranging Request message (RNG-REQ) 908. The base station may receive the RNG-REQ 908 and respond with a Ranging Response message (RNG-RSP) 910. Measurements of the wireless channel 334 may be performed during initial ranging at 906.

At 912, basic capabilities may be negotiated. For example, the mobile station may transmit a Subscriber Station Basic Capability Request message (SBC-REQ) 914. For some embodiments, capability for sticky region allocation may be added to the list of basic capabilities for the mobile station and for the base station. The base station may receive the SBC-REQ 914 and respond with a Subscriber Station Basic Capability Response message (SBC-RSP) 916. In this manner, the mobile station may advertise that it supports sticky region allocation and may be informed whether the base station supports sticky region allocation, as well. However, even if both communication devices support sticky region allocation, this does not necessarily mean that sticky region allocation will automatically be used. Following the negotiation of basic capabilities at 912, the mobile station may register with the base station at 918.

At 920, additions or modifications to one or more service flows 606 may be performed during or after the connection 604 is established. For example, the mobile station may transmit a Dynamic Service Addition Request message (DSA-REQ) 922. For some embodiments, the DSA-REQ 922 may indicate whether the mobile station wants to use sticky region allocation for this particular connection 604. The base station may receive the DSA-REQ 922 and respond with a Dynamic Service Addition Response message (DSA-RSP) 924. In this manner, the mobile station may request the use of sticky region allocation for the connection and may be informed whether the base station agrees. The base station may deny the request for sticky region allocation, even if the base station can support such allocation capability. For example, the base station may deny the request to employ sticky region allocation based on traffic conditions.

Figure 9B:
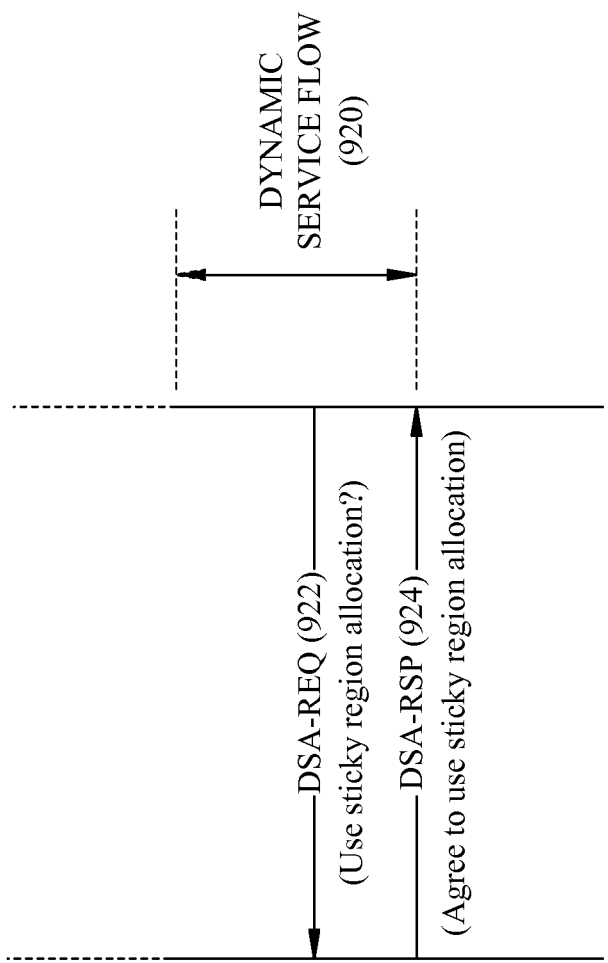

For other embodiments, the base station, rather than the mobile station, may transmit the DSA-REQ 922 as illustrated in FIG. 9B to indicate whether the base station wants to use sticky region allocation for the connection. In such cases, the mobile station may receive the DSA-REQ 922 and respond with a DSA-RSP 924 to inform the base station whether the mobile station has agreed to or denied the request.

Accordingly, if there is no request for sticky region allocation for a particular connection and service flow, sticky region allocation may not be utilized. Therefore, for some embodiments, allocation and utilization of a sticky region may only be performed if both the mobile station 600 and the base station 104 support and agree to use sticky region allocation.

Actual sticky region allocation may be triggered (and may be modified) by transmitting a MAP IE. To initiate sticky region allocation, the base station 104 may send a first MAP IE in the sticky-enabled connection to inform the mobile station 600 where to locate the allocated sticky region. The sticky region may persist in subsequent OFDM/OFDMA frames at the established frame interval until the sticky region is modified or terminated. In this manner, the mobile station may receive or transmit data traffic according to the sticky region without any additional MAP IEs. The sticky region allocation may be dynamically modified when the base station sends a new MAP IE indicating an update to the location, duration, bandwidth, and/or modulation of the allocated sticky region. Furthermore, the base station may terminate the sticky region allocation by transmitting a new MAP IE having a value of zero in the field for the number of OFDM/OFDMA symbols, for example.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by one or more processors, or in a combination of the two. A software module may reside (e.g., stored, encoded, etc.) in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as instructions or as one or more sets of instructions on a computer-readable medium or storage medium. A storage media may be any available media that can be accessed by a computer or by one or more processing devices. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation, and details of the methods and apparatus described above without departing from the scope of the claims.

What is claimed is:

1. A method for sticky region allocation, comprising:
   negotiating a capability for sticky region allocation;
   establishing a sticky-enabled connection in response to the capability negotiating;
   agreeing to or requesting an allocated data region for the sticky-enabled connection, wherein the allocated data region is allocated based on traffic characteristics from signaling messages and classifier information related to the established sticky-enabled connection;
   receiving a first signal based on a first orthogonal frequency-division multiplexing (OFDM) or orthogonal frequency division multiple access (OFDMA) frame over the sticky-enabled connection;
   locating the allocated data region in the first frame according to a first MAP information element (IE);
   receiving a second signal based on a second OFDM or OFDMA frame, wherein the second signal is received later than the first signal over the sticky-enabled connection; and
   locating the allocated data region in the second frame according to the first MAP IE without using a second MAP IE.

2. The method of claim 1, wherein negotiating the capability for sticky region allocation occurs during network entry (NE) procedures.

3. The method of claim 2, wherein negotiating the capability comprises:
   transmitting a Subscriber Station Basic Capability Request (SBC-REQ) regarding the capability for sticky region allocation; and
   receiving a Subscriber Station Basic Capability Response (SBC-RSP) affirming the capability for sticky region allocation.

4. The method of claim 1, wherein agreeing to or requesting the allocated data region for the sticky-enabled connection comprises establishing a service flow.

5. The method of claim 4, wherein establishing the service flow comprises:
   receiving a Dynamic Service Addition Request (DSA-REQ) to use sticky region allocation for the service flow; and
   transmitting a Dynamic Service Addition Response (DSA-RSP) agreeing to use sticky region allocation.

6. The method of claim 4, wherein establishing the service flow comprises:
   transmitting a Dynamic Service Addition Request (DSA-REQ) to use sticky region allocation for the service flow; and
   receiving a Dynamic Service Addition Response (DSA-RSP) agreeing to use sticky region allocation.

7. The method of claim 1, further comprising:
   receiving a third signal based on a third OFDM or OFDMA frame, wherein the third signal is received later than the second signal; and
   locating an updated allocated data region in the third frame according to a third MAP IE, wherein the updated allocated data region has at least one of a different location, duration, bandwidth, or modulation from the allocated data region located according to the first MAP IE.

8. The method of claim 7, wherein the third MAP IE is in the third frame.

9. The method of claim 1, further comprising:
   receiving a third signal based on a third OFDM or OFDMA frame having a third MAP IE with a zero in a field for a number of OFDM/OFDMA symbols, wherein the third signal is received later than the second signal; and
   terminating the sticky region allocation.

10. The method of claim 1, wherein the sticky-enabled connection is a downlink (DL) connection, the allocated data region is a DL data region, and the first MAP IE is a DL-MAP IE.

11. The method of claim 1, wherein the sticky-enabled connection is an uplink (UL) connection, the allocated data region is a UL data region, and the first MAP IE is a UL-MAP IE.

12. The method of claim 1, wherein the first MAP IE is in the first frame.

13. The method of claim 1, further comprising receiving a third signal based on a third OFDM or OFDMA frame containing the first MAP IE, wherein the third signal is received prior to the first signal.

14. The method of claim 1, wherein the traffic characteristics and classifier information relate to at least a Quality of Service (QoS) parameter.

15. A non-transitory computer-readable medium having instructions stored thereon, the instructions being executable by one or more processors and the instructions comprising:
 instructions for negotiating a capability for sticky region allocation;
 instructions for establishing a sticky-enabled connection in response to the capability negotiating;
 instructions for agreeing to or requesting an allocated data region for the sticky-enabled connection, wherein the allocated data region is allocated based on traffic characteristics from signaling messages and classifier information related to the established sticky-enabled connection;
 instructions for receiving a first signal based on a first orthogonal frequency-division multiplexing (OFDM) or orthogonal frequency division multiple access (OFDMA) frame over the sticky-enabled connection;
 instructions for locating the allocated data region in the first frame according to a first MAP information element (IE);
 instructions for receiving a second signal based on a second OFDM or OFDMA frame, wherein the second signal is received later than the first signal over the sticky-enabled connection; and
 instructions for locating the allocated data region in the second frame according to the first MAP IE without using a second MAP IE.

16. The computer-readable medium of claim 15, wherein negotiating the capability comprises:
 transmitting a Subscriber Station Basic Capability Request (SBC-REQ) regarding the capability for sticky region allocation; and
 receiving a Subscriber Station Basic Capability Response (SBC-RSP) affirming the capability for sticky region allocation.

17. The computer-readable medium of claim 15, wherein agreeing to or requesting the allocated data region for the sticky-enabled connection comprises establishing a service flow.

18. The computer-readable medium of claim 17, wherein establishing the service flow comprises:
 receiving a Dynamic Service Addition Request (DSA-REQ) to use sticky region allocation for the service flow; and
 transmitting a Dynamic Service Addition Response (DSA-RSP) agreeing to use sticky region allocation.

19. The computer-readable medium of claim 17, wherein establishing the service flow comprises:
 transmitting a Dynamic Service Addition Request (DSA-REQ) to use sticky region allocation for the service flow; and
 receiving a Dynamic Service Addition Response (DSA-RSP) agreeing to use sticky region allocation.

20. The computer-readable medium of claim 15, further storing:
 instructions for receiving a third signal based on a third OFDM or OFDMA frame, wherein the third signal is received later than the second signal; and
 instructions for locating an updated allocated data region in the third frame according to a third MAP IE, wherein the updated allocated data region has at least one of a different location, duration, bandwidth, or modulation from the allocated data region located according to the first MAP IE.

21. The computer-readable medium of claim 15, further storing:
 instructions for receiving a third signal based on a third OFDM or OFDMA frame having a third MAP IE with a zero in a field for a number of OFDM/OFDMA symbols, wherein the third signal is received later than the second signal; and
 instructions for terminating the sticky region allocation.

22. The computer-readable medium of claim 15, wherein the sticky-enabled connection is a downlink (DL) connection, the allocated data region is a DL data region, and the first MAP IE is a DL-MAP IE.

23. The computer-readable medium of claim 15, wherein the sticky-enabled connection is an uplink (UL) connection, the allocated data region is a UL data region, and the first MAP IE is a UL-MAP IE.

24. A mobile device, comprising:
 a processor coupled to a memory, the memory holding instructions executable by the processor to cause the mobile device to negotiate a capability for sticky region allocation, establish a sticky-enabled connection in response to the capability negotiation, and agree to or request an allocated data region for the sticky-enabled connection, wherein the allocated data region is allocated based on traffic characteristics from signaling messages and classifier information related to the established sticky-enabled connection;
 a radio frequency (RF) front end for receiving a first signal based on a first orthogonal frequency-division multiplexing (OFDM) or orthogonal frequency division multiple access (OFDMA) frame over the sticky-enabled connection and for receiving a second signal based on a second OFDM or OFDMA frame, wherein the second signal is received later than the first signal over the sticky-enabled connection; and
 a MAP parser configured to locate the allocated data region in the first frame according to a first MAP information element (IE) and to locate the allocated data region in the second frame according to the first MAP IE without using a second MAP IE.

25. The mobile device of claim 24, wherein the memory holds further instructions executable by the processor to:
 transmit a Subscriber Station Basic Capability Request (SBC-REQ) regarding the capability for sticky region allocation; and
 receive a Subscriber Station Basic Capability Response (SBC-RSP) affirming the capability for sticky region allocation.

26. The mobile device of claim 24, wherein the allocation logic is configured the memory holds further instructions executable by the processor to agree to or request the allocated data region for the sticky-enabled connection by establishing a service flow.

27. The mobile device of claim 26, wherein the memory holds further instructions executable by the processor for establishing the service flow by:

receiving a Dynamic Service Addition Request (DSA-REQ) to use sticky region allocation for the service flow; and transmitting a Dynamic Service Addition Response (DSA-RSP) agreeing to use sticky region allocation.

28. The mobile device of claim 26, wherein the memory holds further instructions executable by the processor for establishing the service flow by:

transmitting a Dynamic Service Addition Request (DSA-REQ) to use sticky region allocation for the service flow; and receiving a Dynamic Service Addition Response (DSA-RSP) agreeing to use sticky region allocation.

29. The mobile device of claim 24, wherein the RF front end is configured to receive a third signal based on a third OFDM or OFDMA frame and received later than the second signal; the MAP parser is configured to locate an updated allocated data region in the third frame according to a third MAP IE; and the updated allocated data region has at least one of a different location, duration, bandwidth, or modulation from the allocated data region located according to the first MAP IE.

30. The mobile device of claim 24, wherein the RF front end is configured to receive a third signal based on a third OFDM or OFDMA frame having a third MAP IE with a zero in a field for a number of OFDM/OFDMA symbols, the third signal is received later than the second signal, and the MAP parser is configured to effectively terminate the sticky region allocation by disregarding the allocated data region.

31. The mobile device of claim 24, wherein the sticky-enabled connection is a downlink (DL) connection, the allocated data region is a DL data region, and the first MAP IE is a DL-MAP IE.

32. The mobile device of claim 24, wherein the sticky-enabled connection is an uplink (UL) connection, the allocated data region is a UL data region, and the first MAP IE is a UL-MAP IE.

33. A method for sticky region allocation, comprising:
negotiating a capability for sticky region allocation;
establishing a sticky-enabled connection in response to the capability negotiating;
allocating a data region based on traffic characteristics from signaling messages and classifier information related to the established sticky-enabled connection;
transmitting, over the sticky-enabled connection, a first signal based on a first orthogonal frequency-division multiplexing (OFDM) or orthogonal frequency division multiple access (OFDMA) frame having a MAP information element (IE) for locating the allocated data region in a starting OFDM or OFDMA frame; and
transmitting, over the sticky-enabled connection, a second signal based on a second OFDM or OFDMA frame without a MAP IE for locating the allocated data region in the second frame, wherein the second signal is transmitted later than the first signal and a signal based on the starting frame.

34. The method of claim 33, wherein negotiating the capability for sticky region allocation occurs during network entry (NE) procedures.

35. The method of claim 34, wherein negotiating the capability comprises:
receiving a Subscriber Station Basic Capability Request (SBC-REQ) regarding the capability for sticky region allocation; and
transmitting a Subscriber Station Basic Capability Response (SBC-RSP) affirming the capability for sticky region allocation.

36. The method of claim 33, wherein establishing the sticky-enabled connection comprises establishing a service flow.

37. The method of claim 36, wherein establishing the service flow comprises:
receiving a Dynamic Service Addition Request (DSA-REQ) to use sticky region allocation for the service flow; and
transmitting a Dynamic Service Addition Response (DSA-RSP) agreeing to use sticky region allocation.

38. The method of claim 36, wherein establishing the service flow comprises:
transmitting a Dynamic Service Addition Request (DSA-REQ) to use sticky region allocation for the service flow; and
receiving a Dynamic Service Addition Response (DSA-RSP) agreeing to use sticky region allocation.

39. The method of claim 33, wherein allocating the data region comprises considering one or more Quality of Service (QoS) parameters for the established connection.

40. The method of claim 33, further comprising:
updating the allocated data region to have at least one of a different location, duration, bandwidth, or modulation from the allocated data region; and
transmitting a third signal based on a third OFDM or OFDMA frame with a new MAP IE for locating the updated allocated data region in the third frame or a subsequent frame, wherein the third signal is transmitted later than the second signal.

41. The method of claim 33, further comprising:
transmitting a third signal based on a third OFDM or OFDMA frame having a new MAP IE with a zero in a field for a number of OFDM/OFDMA symbols, wherein the third signal is transmitted later than the second signal; and
terminating the sticky region allocation.

42. The method of claim 33, wherein the sticky-enabled connection is a downlink (DL) connection, the allocated data region is a DL data region, and the MAP IE for locating the data region in the starting frame is a DL-MAP IE.

43. The method of claim 33, wherein the sticky-enabled connection is an uplink (UL) connection, the allocated data region is a UL data region and the MAP IE for locating the data region in the starting frame is a UL-MAP IE.

44. The method of claim 33, wherein the starting frame is the first frame and the first signal is the signal based on the starting frame.

45. The method of claim 33, wherein a signal based on the starting frame is transmitted later than the first signal.

46. The method of claim 33, wherein the traffic characteristics and classifier information relate to at least a Quality of Service (QoS) parameter.

47. A non-transitory computer-readable medium having instructions stored thereon, the instructions being executable by one or more processors and the instructions comprising:
instructions for negotiating a capability for sticky region allocation;
instructions for establishing a sticky-enabled connection in response to the capability negotiating;
instructions for allocating a data region based on traffic characteristics from signaling messages and classifier information related to the established sticky-enabled connection;
instructions for transmitting, over the sticky-enabled connection, a first signal based on a first orthogonal frequency-division multiplexing (OFDM) or orthogonal frequency division multiple access (OFDMA) frame having a MAP information element (IE) for locating the allocated data region in a starting OFDM or OFDMA frame; and instructions for transmitting, over the sticky-enabled connection, a second signal based on a second OFDM or OFDMA frame without a MAP IE for locating the allocated data region in the second frame, wherein the second signal is transmitted later than the first signal and a signal based on the starting frame.

48. The computer-readable medium of claim 47, wherein negotiating the capability comprises:

receiving a Subscriber Station Basic Capability Request (SBC-REQ) regarding the capability for sticky region allocation; and transmitting a Subscriber Station Basic Capability Response (SBC-RSP) affirming the capability for sticky region allocation.

49. The computer-readable medium of claim 47, wherein establishing the sticky-enabled connection comprises establishing a service flow.

50. The computer-readable medium of claim 49, wherein establishing the service flow comprises:

receiving a Dynamic Service Addition Request (DSA-REQ) to use sticky region allocation for the service flow; and transmitting a Dynamic Service Addition Response (DSA-RSP) agreeing to use sticky region allocation.

51. The computer-readable medium of claim 49, wherein establishing the service flow comprises:

transmitting a Dynamic Service Addition Request (DSA-REQ) to use sticky region allocation for the service flow; and receiving a Dynamic Service Addition Response (DSA-RSP) agreeing to use sticky region allocation.

52. The computer-readable medium of claim 47, wherein allocating the data region comprises considering one or more Quality of Service (QoS) parameters for the established connection.

53. The instructions computer-readable medium of claim 47, further storing:

instructions for updating the allocated data region to have at least one of a different location, duration, bandwidth, or modulation from the allocated data region; and instructions for transmitting a third signal based on a third OFDM or OFDMA frame with a new MAP IE for locating the updated allocated data region in the third frame or a subsequent frame, wherein the third signal is transmitted later than the second signal.

54. The instructions computer-readable medium of claim 47, further storing:

instructions for transmitting a third signal based on a third OFDM or OFDMA frame having a new MAP IE with a zero in a field for a number of OFDM/OFDMA symbols, wherein the third signal is transmitted later than the second signal; and instructions for terminating the sticky region allocation.

55. The computer-readable medium of claim 47, wherein the sticky-enabled connection is a downlink (DL) connection, the allocated data region is a DL data region, and the MAP IE for locating the data region in the starting frame is a DL-MAP IE.

56. The computer-readable medium of claim 47, wherein the sticky-enabled connection is an uplink (UL) connection, the allocated data region is a UL data region and the MAP IE for locating the data region in the starting frame is a UL-MAP IE.

57. A base station, comprising:

a processor coupled to a memory holding instructions executable by the processor to cause the base station to negotiate a capability for sticky region allocation, to establish a sticky-enabled connection in response to the capability negotiating, and to allocate a data region based on traffic characteristics from signaling messages and classifier information related to the established sticky-enabled connection;

a transmitter front end configured to transmit, over the sticky-enabled connection, a first signal based on a first orthogonal frequency-division multiplexing (OFDM) or orthogonal frequency division multiple access (OFDMA) frame having a MAP information element (IE) for locating the allocated data region in a starting OFDM or OFDMA frame and to transmit, over the sticky-enabled connection, a second signal based on a second OFDM or OFDMA frame without a MAP IE for locating the allocated data region in the second frame, wherein the second signal is transmitted later than the first signal and a signal based on the starting frame.

58. The base station of claim 57, wherein the memory holds further instructions configured to negotiate the capability for sticky region allocation by:

receiving a Subscriber Station Basic Capability Request (SBC-REQ) regarding the capability for sticky region allocation; and transmitting a Subscriber Station Basic Capability Response (SBC-RSP) affirming the capability for sticky region allocation.

59. The base station of claim 57, wherein the memory holds further instructions configured to establish a service flow.

60. The base station of claim 59, wherein the memory holds further instructions for establishing the service flow by:

receiving a Dynamic Service Addition Request (DSA-REQ) to use sticky region allocation for the service flow; and transmitting a Dynamic Service Addition Response (DSA-RSP) agreeing to use sticky region allocation.

61. The base station of claim 59, wherein the memory holds further instructions for establishing the service flow by:

transmitting a Dynamic Service Addition Request (DSA-REQ) to use sticky region allocation for the service flow; and receiving a Dynamic Service Addition Response (DSA-RSP) agreeing to use sticky region allocation.

62. The base station of claim 57, wherein the memory holds further instructions for allocating the data region further based on one or more Quality of Service (QoS) parameters for the established connection.

63. The base station of claim 57, wherein the memory holds further instructions for updating the allocated data region to have at least one of a different location, duration, bandwidth, or modulation from the allocated data region by transmitting a third signal based on a third OFDM or OFDMA frame with a new MAP IE for locating the updated allocated data region in the third frame or a subsequent frame later than the second signal.

64. The base station of claim 57, wherein the memory holds further instructions for terminating the sticky region allocation by transmitting a third signal based on a third OFDM or OFDMA frame having a new MAP IE with a zero in a field for a number of OFDM/OFDMA symbols later than the second signal.

65. The base station of claim 57, wherein the sticky-enabled connection is a downlink (DL) connection, the allocated data region is a DL data region, and the MAP IE for locating the data region in the starting frame is a DL-MAP IE.

66. The base station of claim 57, wherein the sticky-enabled connection is an uplink (UL) connection, the allocated data region is a UL data region and the MAP IE for locating the data region in the starting frame is a UL-MAP IE.

* * * * *